United States Patent
Murakami

(10) Patent No.: US 6,783,486 B1
(45) Date of Patent: Aug. 31, 2004

(54) OUTSERT MOLDED PRODUCT, ITS MANUFACTURING METHOD, AND ITS SORTING METHOD

(75) Inventor: Kenji Murakami, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/581,926

(22) PCT Filed: Nov. 24, 1999

(86) PCT No.: PCT/JP99/06544

§ 371 (c)(1),
(2), (4) Date: Aug. 25, 2000

(87) PCT Pub. No.: WO00/30828

PCT Pub. Date: Jun. 2, 2000

(30) Foreign Application Priority Data

Nov. 25, 1998 (JP) .......................... 10-333569

(51) Int. Cl.⁷ .............................................. B29C 45/14
(52) U.S. Cl. ......................................... 493/140; 225/96
(58) Field of Search ................................ 428/139, 140, 428/23; 427/247; 229/96; 29/410

(56) References Cited

U.S. PATENT DOCUMENTS

| | | | | |
|---|---|---|---|---|
| 3,379,568 A | * | 4/1968 | Holmes ................... | 428/139 X |
| 3,415,709 A | * | 12/1968 | Santangelo ............. | 428/139 X |
| 3,435,127 A | * | 3/1969 | Rose et al. ............. | 428/139 X |
| 3,672,986 A | * | 6/1972 | Schneble, Jr. et al. ...... | 428/139 |
| 4,060,947 A | * | 12/1977 | Naka ....................... | 428/139 X |
| 4,075,395 A | * | 2/1978 | Ohnishi ................... | 428/139 X |
| 4,296,542 A | * | 10/1981 | Gotman .................... | 225/96 X |
| 4,728,557 A | * | 3/1988 | Asano et al. ............. | 428/140 X |
| 4,744,550 A | * | 5/1988 | Oglesbee ................. | 225/96 X |
| 4,916,002 A | * | 4/1990 | Carver ..................... | 428/139 |
| 5,087,504 A | * | 2/1992 | Kanai et al. ............. | 428/139 X |
| 5,104,715 A | * | 4/1992 | Cruz ....................... | 428/139 X |
| 5,126,184 A | * | 6/1992 | Yabe et al. .............. | 428/140 X |
| 5,495,655 A | * | 3/1996 | Morioka ................... | 29/410 |
| 5,759,668 A | * | 6/1998 | Ishikawa et al. ........ | 428/139 X |
| 6,238,771 B1 | * | 5/2001 | Nakao ....................... | 428/139 |

FOREIGN PATENT DOCUMENTS

| | | |
|---|---|---|
| DE | 43 44 059 | 6/1995 |
| EP | 06-285902 | 10/1994 |
| EP | 08-181464 | 7/1996 |
| JP | 08-192440 | 7/1996 |

OTHER PUBLICATIONS

English translation of Japanese search report for PCT/JP99/06544 dated Mar. 17, 2000.

* cited by examiner

Primary Examiner—Charles Goodman
(74) Attorney, Agent, or Firm—RatnerPrestia

(57) ABSTRACT

An outsert molded product allows easy separation between a substrate part and a resin part at the time of disposal of the product. As a result, a significant effect of promoting preservation of the global environment can be achieved. The outsert molded product comprises a metal substrate having a fixing hole, an anchor formed by a resin that is fixed to the substrate and a groove formed in at least a surface of the anchor. The anchor is provided continuously inside the fixing hole and both surfaces of the substrate including the fixing hole, and the groove is formed nearly in the shape of a ring in such position that the fixing hole is projected nearly in the vertical direction to the substrate. A method of sorting an outsert molded product comprises steps of: (a) providing an outsert molded product described above, (b) applying a force from a surface of an inner circumferential part of the groove toward the fixing hole so that the inner circumferential part of the groove including a resin-filled part that is located inside the fixing hole is separated from the outsert molded product, and (c) separating a resin portion remaining from the metal substrate.

14 Claims, 5 Drawing Sheets

(a)

(b)

(a)

(b)

(a)

(b)

(a)

(b)

OUTSERT MOLDED PRODUCT, ITS MANUFACTURING METHOD, AND ITS SORTING METHOD

TECHNICAL FIELD

The present invention relates to an outsert molded product formed integrally by molding a metal substrate and a resin material.

BACKGROUND ART

An outsert molding process is for injection-molding a resin material in a predetermined position on a metal substrate, for example, by using a molding die. The metal substrate is subjected to such processing as punching, bending and drawing. For the resin material, one having such characteristic as flexibility, slidability and light weight is employed. For the metal substrate, one having such characteristic as a high mechanical strength and a high heat-radiating property is used. A product obtained by such outsert molding process is integrally formed by the metal and resin material. Therefore, in the outsert molded product, various mechanical functions can be provided in a component. In addition, the outsert molding method provides a high mass-productivity and lower component and assembly costs.

FIGS. 5 and 6 show sectional views of a main part of a conventional outsert molded product.

In FIG. 5, the conventional outsert molded product has a metal substrate 1 and a functional element 2 formed by a resin. The metal substrate 1 is a base of the outsert molded product. The functional element 2 provides a function for attachment to the other component or the like. A resin material plasticized to a flowable state is injected through a gate 3 from a nozzle of a resin molding apparatus (not shown) into a metal die (not shown) covering front and back sides of the metal substrate 1. The resin material is directed through a runner 4 to a predetermined position on the metal substrate 1. An anchor 5 is formed by a resin, and serves for securing the functional element 2 against the metal substrate 1. The metal substrate 1 has a fixing hole 6. The fixing hole 6 serves for fixing the anchor 5 to the metal substrate 1 at a sufficient strength. Although the fixing hole 6 is nearly of a circular shape, it may be formed in various shapes according to the shape of the functional element 2.

The resin material injected through the gate 3 is passed through the runner 4 and the fixing hole 6 of the metal substrate 1, and reaches the functional element 2 and the anchor 5. Then, the resin material integral with the metal substrate 1 is cooled. After that, the resin material in the die is cooled. Finally, the resin material integral with the metal substrate is removed from the die. In such manner, an outsert molded product is produced.

Since importance of preserving the global environment has been recently pointed out, such design is demanded even in the field of industrial products that contributes to saving of resources and energy and reduction of wastes. Thus, it is desired to classify waste materials by types in disposal of products, and reuse the classified waste materials. However, in an outsert molded product, a resin material is, as described above, formed on a metal substrate at a sufficient bonding strength. Therefore, it has been difficult to easily separate a metal portion from a resin portion in disposal of the product. For example, in the case the resin material is such high-molecular compound as polyacetal (represented by polyoxymethylene), because a bonding strength between the resin material and a metal is particularly high, it has been difficult to separate the metal from the resin material. Additionally, in an outsert molded product containing a metal with the fixing hole 6 formed therein, it has been required to separate the metal from a resin by crushing a resin portion about the fixing metal 6 into pieces. Thus, a conventional outsert molded product has required a lot of time and labor for such separation, or has been disposed as an industrial waste without being subjected to such separation. Such conventional molding method has never been preferable in terms of environmental protection.

To cope with such problem, a technique described in Japanese Patent Laid-open Publication No. 8-192440 was suggested. FIG. 6 shows a constitution of another outsert molded product of prior art.

In FIG. 6, a resin material injected through a gate 3 is directed through a runner 4 that is located in either side of the metal substrate 1 to a predetermined position in the metal substrate 1. Flows of the molten resin material of a high temperature lead along both sides of the substrate 1 are joined inside the fixing hole 6 of the metal substrate 1 in the anchor 5, and form a weld line 8. A bonding strength between the flows of resin along the weld line 8 is lower than that in the other portion. Therefore, in disposal of a product, a metal portion can be separated from a resin portion by separating the resin portion in a side of the metal substrate 1.

However, in the conventional constitution described above, the molten resin material in the anchor 5 closer to the gate 3 comes in at a high speed in a molten state of a high temperature. As a result, the flows are bonded at a high strength in the weld line 8 formed inside the fixing hole 6 of the metal substrate 1. Accordingly, it is likely that a product cannot be easily broken along the weld line 8 at the time of disposal. In addition, in order to provide a weld line in a desired position, it is required to optimize such molding condition as temperature control of a fluidized resin material and pressure control for injection of the resin through the gate 3 as well as such die design as a structure of the gate and shape of the runner, which has been very difficult. Besides, such controls and die design have posed significant limitation to the degree of freedom in designing the functional element 2 has been significantly limited.

The invention provides an outsert molded product with a metal portion easily separated from a resin portion at the time of disposal of the product without affecting the degree of freedom in designing a die and a product.

SUMMARY OF THE INVENTION

An outsert molded product according to the invention comprises:
  a metal substrate having a fixing hole,
  an anchor fixed to the fixing hole, and formed by a resin, and
  a groove formed in at least a surface of the anchor,
  wherein the anchor is disposed continuously in the fixing hole and both sides of the substrate including the fixing hole, and the groove is nearly in the shape of a ring formed in such position that the fixing hole is projected nearly in the vertical direction to the substrate.

A method of producing an outsert molded product according to the invention comprises steps of:
  (a) setting a metal substrate having a fixing hole in a die,
  (b) supplying a resin to a cavity of the die with the metal substrate set therein, (c) molding the resin, and (d) removing the outsert molded product formed integrally with the metal substrate from the die, wherein the cavity is of such shape that an anchor placed in both sides of the metal substrate including an inner side of the fixing cavity and a groove disposed in a predetermined surface of the anchor can be formed therein, and the groove is nearly in the shape of a ring formed in such position that the fixing hole is projected nearly in the vertical direction to the substrate.

A separating method of an outsert molded product according to the invention comprises steps of:

(a) providing an outsert molded product described above, (b) applying a force from a surface of an inner circumferential part of the groove toward the fixing hole so that the inner circumferential part of the groove including a resin-filled portion that is located in the fixing hole is separated from the outsert molded product, and (c) separating a resin portion remaining from the metal substrate.

According to such constitution, a substrate portion and a resin portion can be easily separated from each other at the time of disposal of a product. As a result, a significant effect of promoting preservation of the global environment can be obtained.

BEST MODE OF CARRYING OUT THE INVENTION

Figure 1:
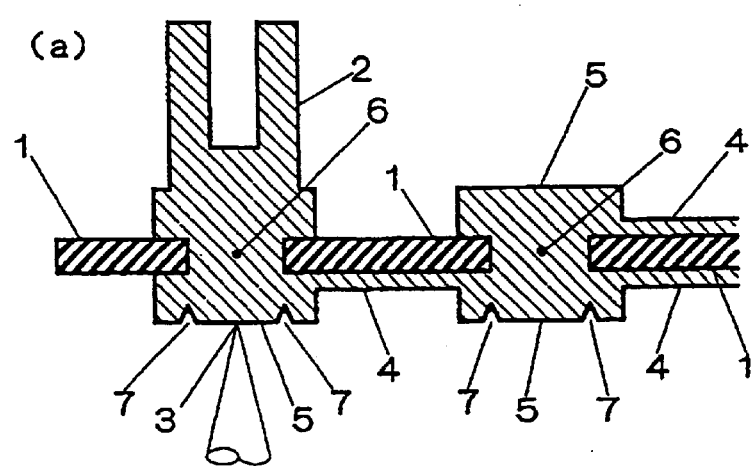
FIG. 1 is a sectional view showing a main part of an outsert molded product according to an embodiment of the invention.
Figure 1:
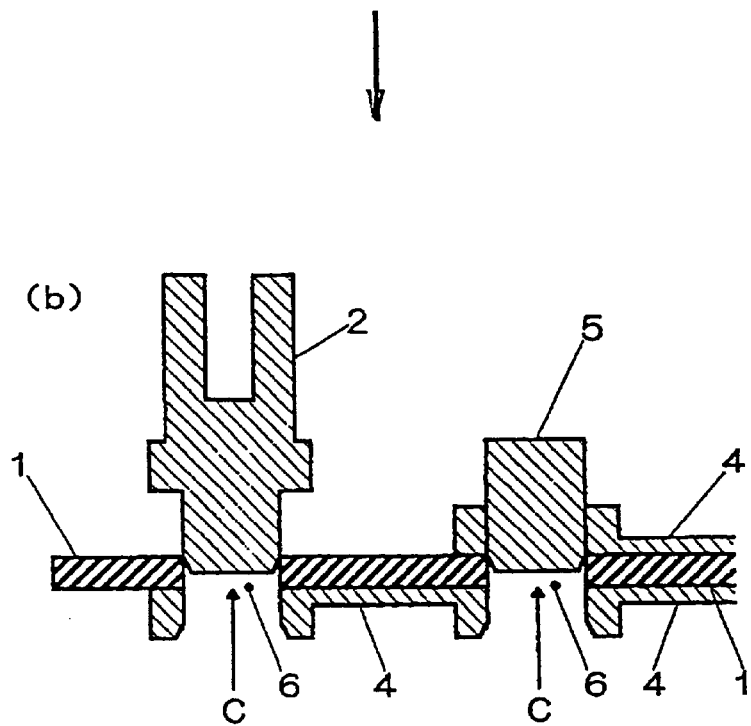

An outsert molded product according to an embodiment of the invention is characterized in that, in an outsert molded product produced by forming in both sides of a substrate an anchor that is larger in shape than a fixing hole provided in the substrate, and is formed by injection molding of a resin, a groove conforming to the shape of the fixing hole is provided in at least a surface of the anchor in such position that the fixing hole is projected nearly in the vertical direction to the substrate. According to such constitution, at the time of disposal of the product, a metal portion and a resin portion in the groove can be easily separated from each other by applying an impact to an inner portion of the groove in the direction of the fixing hole using a jig of a shape identical to that of the fixing hole. In addition, because it is not required to form a weld line as described in Japanese Patent Laid-open Publication No. 8-192440, an outsert molded product can be achieved rendering a degree of freedom in designing a die and a product without causing complication in designing a die in term of the shape of a runner and the like.

An outsert molded product according to another embodiment of the invention is characterized in that, in an outsert molded product produced by forming in both sides of a substrate an anchor that is larger in shape than a fixing hole provided in the substrate, and is formed by injection molding of a resin, a groove conforming to the shape of the fixing hole is provided in at least a surface of the anchor in such position that the fixing hole is projected nearly in the vertical direction to the substrate, and the anchor is formed with a stepped portion in such manner that a portion of the anchor is higher in an inner side of the groove than that in an outer side of the groove. According to such constitution, an effect similar to that described above can be achieved, and a jig nearly used can be commonly applied to plural anchors without preparing a jig having a shape identical to that of the fixing hole.

It is specifically preferable that the position of the groove provided in a surface of the anchor is located in an inner side from the position the fixing hole is projected nearly in the vertical direction to the substrate, and the position of the groove provided in the other surface is located outward from the position the fixing hole is projected nearly in the vertical direction to the substrate. As a result of such constitution, at the time of disposal of the product, a metal portion and a resin portion can be separated effortlessly from each other by applying an impact from the side of the groove that is located in an inner side from a line vertical to the fixing hole, because a rupture surface of the anchor comes to be in the form of an inclined surface, the block ruptured cannot be caught by the metal surface 1 or runner 4.

It is specifically preferable that the resin material is polyacetal. In the case the resin material is polyacetal, since a bonding strength with a metal is high in such complicated part as the fixing hole because of its high strength, friction wearing property, creep property and fatigue property, separation of a metal portion from a resin portion can be easily achieved at the time of disposal of a product by providing a groove or stepped portion in an anchor.

Exemplary Embodiment 1

An outsert molded product according to a typical embodiment of the invention is described below by referring to FIG. 1. FIG. 1 is a sectional view showing a main part of an outsert molded product according to an embodiment of the invention.

In FIG. 1(a), an outsert molded product comprises a metal substrate 1, an anchor 5, a functional element 2 and a runner 4. The metal substrate 1 has a fixing hole 6. The anchor 5 is formed by a resin material. The anchor 5 is provided continuously with an interior of the fixing hole 6 and front and back surfaces surrounding the fixing hole 6. The anchor 5 is shaped such that it is larger than the fixing hole 6, and is formed continuously with the front and back surfaces of the metal substrate with the fixing hole 6 located between them. In other words, the fixing hole 6 serves for fixing the anchor 5 to the metal substrate at a high strength. The functional element 2 is, for example, formed by a resin material. The functional element 2 provides, for example, a function for attachment to other component. The runner 4 is made by a resin material. The runner 4 serves for directing a resin material to a predetermined position during molding. In such manner, the anchor 5 is securely fixed to the metal substrate in a position encompassing the fixing hole 6, and the functional element 2 is formed integrally with the anchor 5. The fixing hole 6 is not specifically limited in shape, and may be of a circular, rectangular or polygonal shape, for example.

As shown in FIG. 1(a), a groove 7 conforming to the shape in the planar direction of the fixing hole 6 is formed in at least a surface of the anchor 5 in such position that the fixing hole is projected nearly in the vertical direction to the metal substrate 1. The groove 7 is not specifically limited in shape, and may be, for example, V- or U-shaped in section. It is particularly preferable that the groove 7 is formed in such shape that a stress is converged in the direction of the fixing hole 6 from a tip of the groove 7, when a force is applied to an inner circumference of the groove in the direction of the fixing hole 6. As a shape of the groove for achieving such convergence of a stress, for example, a shape providing a V-shape in section, a shape providing an acute angle at the tip of groove or the like can be employed, for example.

The groove 7 is preferably formed in a shape nearly identical with that of an outer circumference of the fixing hole 6. For example, in the case the fixing hole 6 is of a circular shape, the groove 7 has a circular shape identical with the circular shape. In such manner, the embodiment is characterized in that the groove 7 is formed in at least a surface of the anchor 5.

Next, a method of producing such outsert molded product is described. A metal substrate 1 is placed in a die having a predetermined shape. The metal substrate has a fixing hole 6. The die has a cavity enabling formation of the groove 7, anchor 5, functional element 2 and runner 4 and a gate 3. The die with the metal substrate 1 placed therein is set in an injection molding apparatus. Then, a molten resin material of a predetermined temperature is injected into the die through the gate 3 from a nozzle of the die. The resin material injected enters through the gate 3, and fills the cavity. The fixing hole 6 is also filled with the resin material in the inside. After that, the resin material in the die is cooled. Then, a molded product molded integrally with the metal substrate is removed from the die. In such manner, an outsert molded product is produced. The outsert molded product has the anchor 5 bonded to the inside of fixing hole 6 and both sides of the metal substrate surrounding the fixing hole 6. In addition, the groove 7 is formed in at least a surface of the anchor 5, and the groove 7 is provided in such position that the fixing hole 6 is projected nearly in the vertical direction to the metal substrate 1, and has a shape identical with a shape in the planar direction of the fixing hole 6.

Now, a method of disposal of an outsert molded product having such groove 7 is described. As shown in FIG. 1(b), a force is applied to an inner circumferential part of the groove 7 in the direction of an arrow "C" toward the fixing hole 6. A stress is converged in the direction of the fixing hole 6 from a tip of the groove 7, and the anchor 5 (or the functional element 2) is ruptured by the stress toward the other surface. In such manner, a resin portion located inside the fixing hole 6 is separated from the metal substrate. Further, other resin portions as runner 4 are also separated from the metal substrate. Thus, a metal portion and a resin portion can be easily separated from each other. As a method for applying a force to the inner circumferential part of the groove, such method may be employed, for example, that an impact is applied to a jig, while it is fitted to the inner circumferential part of the groove, although the invention is not specifically limited thereto. It is particularly preferable that the jig has a shape identical with that of the inner circumferential part of the groove or smaller than that.

In the embodiment described above, although the groove 7 is formed in a surface of the anchor 5, the invention is not limited thereto, and the groove 7 may be formed in either surface of the anchor 5. An outsert molded product having the groove 7 in either surface thereof provides the effect even in a superior manner.

Figure 2:
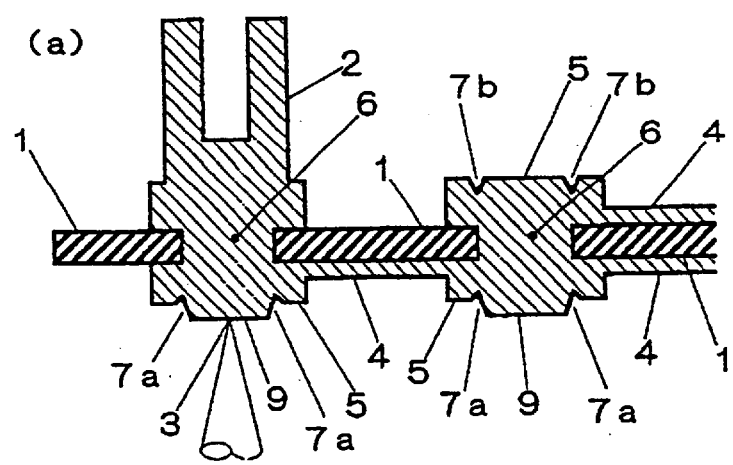
FIG. 2 is a sectional view showing a main part of an outsert molded product according to another embodiment of the invention.
Figure 2:
Figure 2:
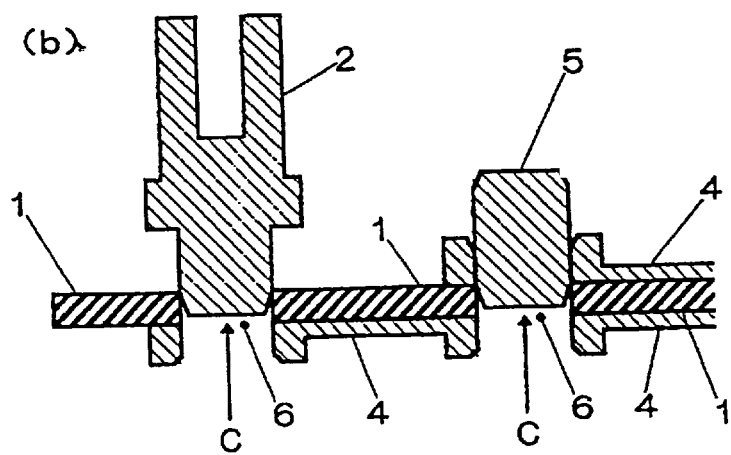

Although two anchors 5 each having a groove 7 are provided in the embodiment shown in FIG. 2, the invention is not limited thereto, and an anchor 5 having a groove 7 or plural, three or more, anchors 5 each having a groove 7 may be provided. In such constitution, an effect similar to that described above can be also obtained.

Exemplary Embodiment 2

Another typical embodiment of the invention is described by referring to FIG. 2. FIG. 2 is a sectional view showing a main part of an outsert molded product according to another embodiment of the invention. In FIG. 2(a), grooves 7a, 7b conforming to the shape of a fixing hole 6 are formed in such positions that the fixing hole 6 is projected nearly in the vertical direction to a metal substrate 1 in at least a surface of an anchor 5. Further, the groove 7a is provided in an inner part thereof with a stepped portion 9 that is higher than an outer part of the groove by a thickness of the metal substrate 1. The grooves 7 are not specifically limited in shape, and can be formed, for example, in a shape having a V-shaped section.

In the embodiment, the groove 7a is formed in a surface of the anchor 5, and the groove 7b is further formed in the other surface. Other parts are constituted similarly to those of embodiment 1.

It is desirable that the thickness of stepped portion 9 is ½ or more than the thickness of metal substrate 1 or 0.5 mm or more. However, the thickness is not specifically limited thereto, and may vary according to a type of resin material and the thickness of metal substrate 1.

In producing an outsert molded product according to the embodiment, a die allowing formation of the stepped portion 9 should be employed. Other parts of the production process is similar to those of embodiment 1.

Next, a method for separating a metal substrate from a resin material of such outsert molded product is described. As shown in FIG. 2(b), a force is applied in the direction of an arrow "C". A stress tends to be converged from the groove 7a in a surface of the anchor 5 toward the groove 7b in the other side, and the anchor 5 located in the fixing hole 6 is thereby separated from the outsert molded product. Then, resin portions remaining are separated from the metal substrate 1. In such manner, the metal substrate and resin portion are separated from each other. A jig employed may not be in a shape nearly identical with that, of the fixing hole 6, and a general cylindrical hammer, for example, may be used as a jig.

Exemplary Embodiment 3

Figure 3:
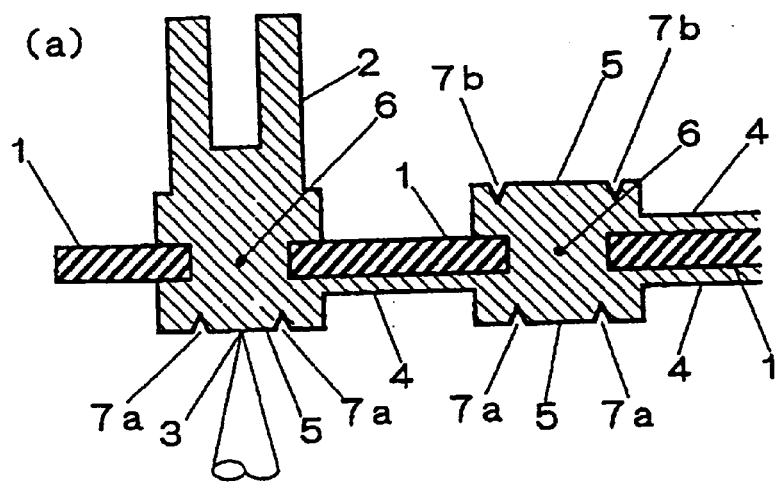
FIG. 3 is a sectional view showing a main part of an outsert molded product according to the other embodiment of the invention.
Figure 3:
Figure 3:
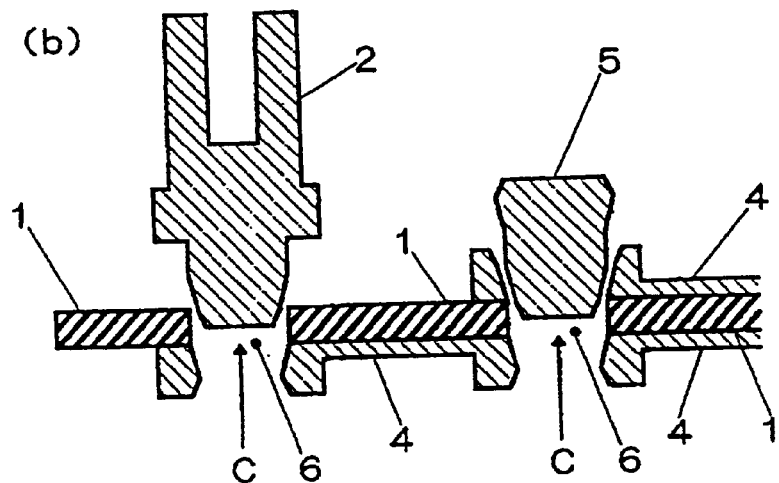

The other embodiment of the invention is described by referring to FIG. 3. FIG. 3 is a sectional view showing a main part of an outsert molded product according to the other embodiment of the invention.

In FIG. 3(a), a groove 7a is formed in a surface of an anchor 5 in an inner side from such position that a fixing hole is projected nearly in the vertical direction to a metal substrate 1. A groove 7b is provided in the other surface of the anchor 5 in an outer side from such position 9 that the fixing hole is projected nearly in the vertical direction to the metal substrate 1. Other parts are constituted similarly to those of embodiment 1.

In producing an outsert molded product according to the embodiment, a die allowing formation of the groove 7a having an outer circumferential shape smaller than that of the fixing hole 6 and the groove 7b having an outer circumferential shape larger than that of the fixing hole 6 should be employed. Other parts of the production process is similar to those of embodiment 1.

Now, a method for separating a metal substrate from a resin material of such outsert molded product is described. As shown in FIG. 3(b), a force is applied in the direction of an arrow "C". By the force, the anchor 5 located in the fixing hole 6 is ruptured to a bowl-shaped block along a line connecting the grooves 7a and 7b. As a result, the block ruptured can be separated easily from the outsert molded product without being caught by the metal substrate 1 and runner 4. In such manner, according to the method of the embodiment, a metal portion can be easily separated from a resin portion without a lot of time and effort.

Exemplary Embodiment 4

Figure 4:
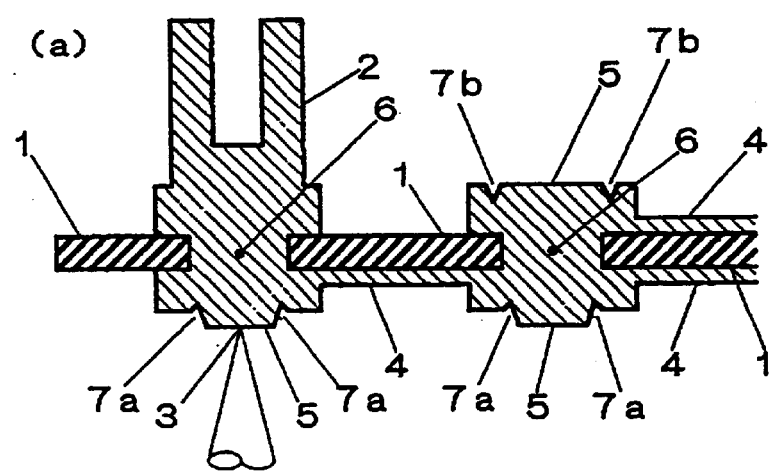
FIG. 4 is a sectional view showing a main part of an outsert molded product according to still other embodiment of the invention.
Figure 4:
Figure 4:
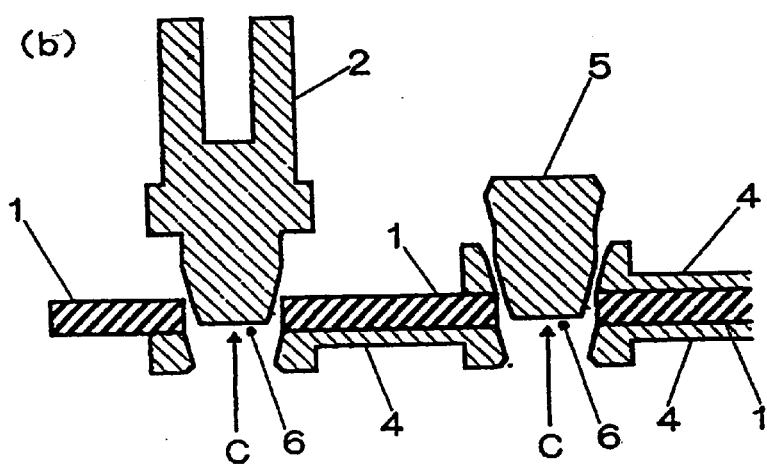
Figure 5:
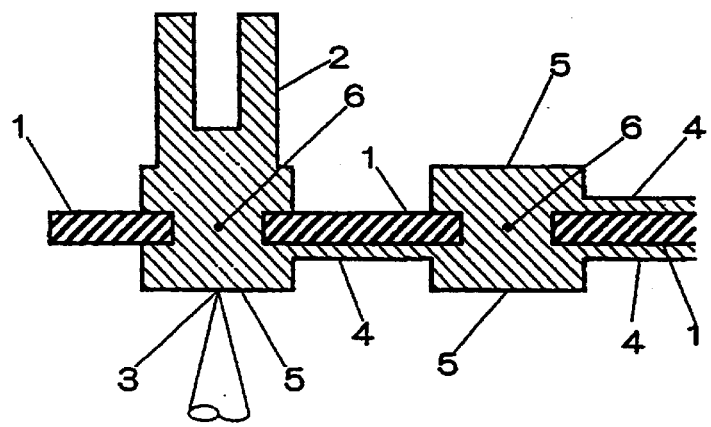
FIG. 5 is a sectional view showing a main part of an outsert molded product according to an embodiment of the prior art.
Figure 6:
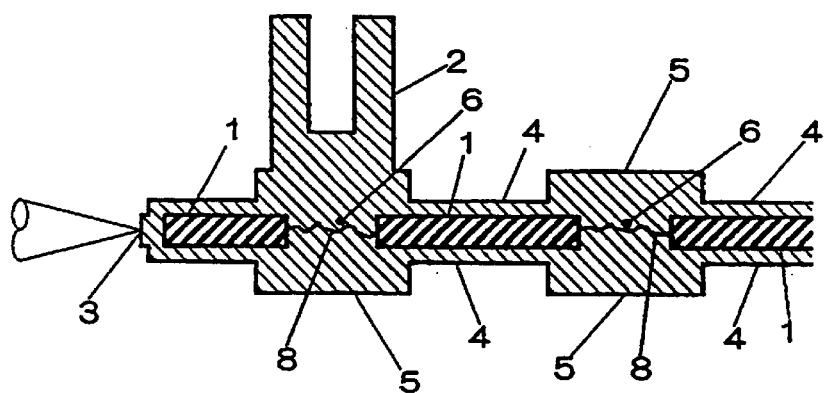
FIG. 6 is a sectional view showing a main part of an outsert molded product according to another embodiment of the prior art.

The other embodiment of the invention is described by referring to FIG. 4. FIG. 4 is a sectional view showing a main part of an outsert molded product according to the other embodiment of the invention.

In FIG. 4(a), a groove 7a is formed in a surface of an anchor 5 in an inner side from such position that a fixing hole is projected nearly in the vertical direction to a metal substrate 1. A groove 7b is provided in the other surface of the anchor 5 in an outer side from such position 9 that the fixing hole is projected nearly in the vertical direction to the metal substrate 1. Further, the groove 7a is provided in an inner part thereof with a stepped portion 9 that is higher than an outer part thereof by a thickness of the metal substrate 1. Other parts are constituted similarly to those of embodiment 1.

In producing an outsert molded product according to the embodiment, a die allowing formation of the groove 7a having an outer circumferential shape smaller than that of the fixing hole 6 and the groove 7b having an outer circumferential shape larger than that of the fixing hole 6 should be employed. Other parts of the production method is similar to those of embodiment 1.

Next, a method for separating a metal substrate from a resin material of such outsert molded product is described. As shown in FIG. 4(b), a force is applied in the direction of an arrow "C". By the force, the anchor 5 located in the fixing hole 6 is ruptured to a bowl-shaped block along a line connecting the grooves 7a and 7b. As a result, the block ruptured can be separated easily from the outsert molded product without being caught by the metal substrate 1 and runner 4. In such manner, according to the method of the embodiment, a metal portion can be easily separated from a resin portion without a lot of time and effort.

Although methods of producing an outsert molded product by using an injection molding process are described in the embodiments, the invention is not limited thereto, and an outsert molded product may be produced by such other molding method as compression molding. The injection molding is specifically preferable, production comes to be significantly easy by using the method, and a production cost can be reduced.

As a resin material used for carrying out the invention, polyacetal is preferably employed, for example, although the invention is not limited thereto. The polyacetal is a high molecular compound expressed by a general formula of —(CHR—O)—, and is also called polyoxymethylene. The polyacetal is superior in mechanical strength, resistance to friction wearing, creep property and resistance to fatigue. In an outsert molded product using the polyacetal, separation of a metal portion from a resin portion can be efficiently and easily achieved. Particularly, when a resin portion is separated from a metal substrate, the resin is never broken into pieces, and separation can be completed with less time and effort.

The grooves 7 may be formed continuously or discontinuously, that is, intermittently in the shape of a ring. It is specifically preferable that they are formed continuously, and the effect described above can be particularly high in such constitution.

Industrial Applicability

According to the constitution of the invention, an outsert molded product allowing easy separation between a metal portion and a resin portion at the time of disposal of the product can be provided without affecting a degree of freedom in designing a die, a product and the like. As a result, a significant effect of promoting preservation of the global environment can be obtained.

What is claimed is:

1. An outsert molded product comprising:
   a metal substrate having a fixing hole, a first surface and a second surface,
   an anchor fixed to said fixing hole, said anchor being formed by a resin, said anchor being disposed continuously within an interior of said fixing hole and both surfaces of said substrate, and
   a groove disposed in at least a first surface of said anchor in such place that said fixing hole is projected nearly in a vertical direction to said substrate, and formed nearly in a shape of a ring.

2. An outsert molded product of claim 1, wherein said groove is provided nearly in such position that an outer circumference of said fixing hole is projected nearly in the vertical direction to said substrate.

3. An outsert molded product of claim 1, wherein said groove is provided within an area formed by a circumference of said fixing hole as projected nearly in the vertical direction to said substrate.

4. An outsert molded product of claim 1, wherein said anchor has a
   stepped portion formed in an inner circumferential part of said groove, and
   said stepped portion protrudes beyond an outer part of said groove.

5. An outsert molded product of claim 1, wherein said groove includes a first groove part formed in said first surface of said anchor and a second groove part formed in a second surface of said anchor,
   said first groove part is formed within an area formed by said fixing hole as projected nearly in the vertical direction to said substrate, and
   said second groove part is formed outside an area formed by said fixing hole as projected nearly in the vertical direction to said substrate.

6. An outsert molded product of claim 1, wherein said groove is formed in such shape that a stress is converged in the direction of said fixing hole from a tip of said groove when a force is applied to an inner circumferential part of said groove in a direction of said fixing hole.

7. An outsert molded product of claim 1, wherein said resin contains polyacetal.

8. An outsert molded product comprising:

a metal substrate having a fixing hole, a first surface and a second surface, and an anchor fixed to said fixing hole, and formed by injection molding of a resin, wherein said anchor is shaped such that said anchor is larger than said fixing hole, said anchor is disposed inside said fixing hole and in both surfaces of said substrate, and a groove conforming to said shape of said fixing hole is disposed in at least a surface of said anchor in such position that said fixing hole is projected nearly in a vertical direction to said substrate.

9. An outsert molded product of claim 8, wherein said groove includes a first groove part formed in a first surface of said anchor and a second groove part formed in a second surface of said anchor, said first groove part is located within an area formed by said fixing hole as projected nearly in the vertical direction to said substrate, and said second groove part is located outside an area formed by said fixing hole as projected nearly in the vertical direction of said substrate.

10. An outsert molded product of claim 8, wherein said resin includes polyacetal.

11. An outsert molded product comprising:

a metal substrate having a fixing hole, a first surface and a second surface, and an anchor fixed to said fixing hole, and formed by injection molding of a resin, wherein said anchor is shaped such that said anchor is larger than said fixing hole, said anchor is disposed inside said fixing hole and in both surfaces of said substrate, a groove conforming to said shape of said fixing hole is formed in at least a first surface of said anchor in such position that said fixing hole is projected nearly in a vertical direction of said substrate, a stepped portion is formed in an inner side of said groove, and said stepped portion is shaped such that it protrudes beyond an outer circumferential side of said groove.

12. An outsert molded product of claim 11, wherein said groove includes a first groove part formed in said first surface of said anchor and a second groove parts formed in a second surface of said anchor, said first groove part is located within an area formed by said fixing hole as projected nearly in the vertical direction to said substrate, and said second groove part is located outside an area formed by said fixing hole as projected nearly in the vertical direction to said substrate.

13. An outsert molded product of claim 11, wherein said resin includes polyacetal.

14. An outsert molded product comprising:

a metal substrate having a top surface and a bottom surface, and a hole from said top surface to said bottom surface;

an anchor attached to said hole, said anchor formed by a resin and disposed continuously within an interior of said hole and attached to both surfaces of said substrate; and a groove disposed in at least a first surface of said anchor, said groove substantially in line with said hole in the substrate in a direction perpendicular to the substrate.

* * * * *